United States Patent
Doukopoulos et al.

(10) Patent No.: US 11,546,203 B2
(45) Date of Patent: Jan. 3, 2023

(54) METHOD FOR ESTIMATION OF AN INTERFERING SIGNAL, METHOD FOR ATTENUATION OF AN INTERFERING SIGNAL CONTAINED IN A RECEIVED SIGNAL, AND RECEIVING SYSTEM

(71) Applicant: FAURECIA CLARION ELECTRONICS EUROPE, Paris (FR)

(72) Inventors: Xenofon Doukopoulos, Massy (FR); Gilles Briand, Bruyeres le Chatel (FR)

(73) Assignee: FAURECIA CLARION ELECTRONICS EUROPE, Paris (FR)

( * ) Notice: Subject to any disclaimer, the term of this patent is extended or adjusted under 35 U.S.C. 154(b) by 0 days.

(21) Appl. No.: 17/381,548

(22) Filed: Jul. 21, 2021

(65) Prior Publication Data
US 2022/0029873 A1    Jan. 27, 2022

(30) Foreign Application Priority Data
Jul. 22, 2020 (FR) .................................. 2007690

(51) Int. Cl.
  *H03K 5/159* (2006.01)
  *H04L 27/38* (2006.01)
  *H04B 17/29* (2015.01)

(52) U.S. Cl.
  CPC ............. *H04L 27/38* (2013.01); *H04B 17/29* (2015.01)

(58) Field of Classification Search
  CPC ..... H04L 1/205; H04L 27/265; H04L 5/0007; H04L 27/2636; H04W 72/082; G01R 31/31709; G01R 29/26
  USPC .................................................. 375/226, 296
  See application file for complete search history.

(56) References Cited

U.S. PATENT DOCUMENTS

| | | | |
|---|---|---|---|
| 6,047,025 A * | 4/2000 | Johnson ............. | H03H 21/0012 375/232 |
| 6,084,919 A * | 7/2000 | Kleider ................. | H04L 1/0015 375/296 |
| 2010/0177857 A1 | 7/2010 | Huttunen | |
| 2012/0051467 A1 * | 3/2012 | Wang ................. | H04L 25/03331 375/340 |

OTHER PUBLICATIONS

French Preliminary Search Report for French App. No. FR2007690 dated Mar. 26, 2021, priority application to the present application, 9 pages, No English Translation avaialble.
Abdullah K et al., "An Interference Cancellation Algorithm for Fourier-based and wavelet-based OFDM systems", Advanced Technologies for Communications, 2008, ATC 2008, International Conference On, IEEE, Piscataway, NJ USA, Oct. 6, 2008, pp. 211-215, 5 pages.

* cited by examiner

*Primary Examiner* — Khai Tran
(74) *Attorney, Agent, or Firm* — Reising Ethington P.C.

(57) ABSTRACT

The present disclosure relates to a method for estimation of an interfering signal of a signal received by a receiving system and to a method for attenuation of an interfering signal contained in a received signal, and a receiving system.

13 Claims, 5 Drawing Sheets

METHOD FOR ESTIMATION OF AN INTERFERING SIGNAL, METHOD FOR ATTENUATION OF AN INTERFERING SIGNAL CONTAINED IN A RECEIVED SIGNAL, AND RECEIVING SYSTEM

PRIORITY CLAIM

This application claims priority to French Application No. FR2007690, filed Jul. 22, 2020, which is expressly incorporated by reference herein.

BACKGROUND

The present disclosure relates to the field of digital broadcasting via radio waves, by terrestrial means or by satellite.

SUMMARY

According to the present disclosure, a method for estimation of an interfering signal (SI) of a signal received by a receiving system, the received signal comprising the interfering signal and a modulated data signal, the received signal comprising at least a previous encoding block and a current encoding block, the previous encoding block and the current encoding block comprising a number N of samples, each sample being identified by an index ranging from 0 to N−1, the method comprising the following steps:

estimating the frequency $\theta_0(n)$ of the interfering signal contained in the current encoding block as a function of the frequency $\theta_0(n-1)$ of the interfering signal contained in the previous encoding block and of the number N of samples of the current block, and estimating the amplitude and phase of the interfering signal contained in the current encoding block, based on the estimated frequency $\theta_0(n)$ of the interfering signal.

In illustrative embodiments, this method is simple to implement. It requires little computing power. It considerably improves the quality of the digital signals received, in particular when these signals have been modulated according to the DAB, DAB+ and DVBT or ISDBT standards.

In illustrative embodiments, this method provides a high precision in estimating the frequency of the interfering signal.

In illustrative embodiments, this method makes it possible to monitor the frequency of the interfering signal even when this frequency varies over time (for example when the electronic chip becomes hot).

In illustrative embodiments, this method does not cause significant degradation of the data signal even when no interfering signal is present or even in the case where the interfering signal is much stronger than the data signal.

In illustrative embodiments, the step of estimating the frequency $\theta_n(n)$ of the interfering signal contained in the current encoding block comprises the following steps for the current encoding block:

setting a first frequency $\theta_1(n)$ of the interfering signal contained in the current encoding block as a function of the frequency $\theta_0(n-1)$ of the interfering signal contained in the previous encoding block, the first frequency $\theta_1(n)$ being equal to the frequency $\theta_0(n-1)$ of the interfering signal of the previous encoding block plus a first value $\delta_1$, the first value $\delta_1$ being less than 1/N, for example less than ½N;

setting a second frequency $\theta_2(n)$ of the interfering signal contained in the current encoding block as a function of the frequency $\theta_0(n-1)$ of the interfering signal contained in the previous encoding block, the second frequency $\theta_2(n)$ being different from the first frequency $\theta_1(n)$, the second frequency $\theta_2(n)$ being equal to the frequency $\theta_0(n-1)$ of the interfering signal of the previous encoding block minus a second value $\delta_2$, the second value $\delta_2$ being less than 1/N, for example less than ½N;

calculating the frequency $\theta_0(n)$ of the interfering signal contained in the current encoding block as a function of the first frequency $\theta_1(n)$ and of the second frequency $\theta_2(n)$.

In illustrative embodiments, the step of calculating the frequency $\theta_0(n)$ comprises the following steps:

calculating the imaginary part of a first product as a function of the Fourier transform of the signal received at the first frequency, calculating the imaginary part of a second product as a function of the Fourier transform of the signal received at the second frequency;

and the frequency $\theta_0(n)$ is a function of the imaginary part of the first product and of the imaginary part of the second product.

In illustrative embodiments, the first product is the product of the Fourier transform of the received signal at the first frequency, and of the complex conjugate of the derivative of the Fourier transform of the signal received at the first frequency; and the second product is the product of the Fourier transform of the signal received at the second frequency, and of the complex conjugate of the derivative of the Fourier transform of the signal received at the second frequency.

In illustrative embodiments, the method further comprises a sub-step (132) during which the frequency $\theta_0(n)$ of the calculated interfering signal is averaged by a forgetting factor based on the relation:

$$\widehat{\theta_0}(n) = \lambda * \widehat{\theta_0}(n-1) + (1-\lambda) * \theta_0(n)$$

where:
$\lambda$ is a forgetting factor comprised between 0 and 1, and
the complex frequency $\widehat{\theta_0}(n)$ is considered to be the estimated value of the real frequency $\theta_0(n)$.

In illustrative embodiments, the first value $\delta_1$ is determined by the following relation:

$$\delta_1 = \frac{1}{(2N)^2}$$

In illustrative embodiments, the second value $\delta_2$ is determined by the following relation:

$$\delta_2 = \frac{1}{(2N)^2}$$

In illustrative embodiments, the method comprises an initial step of receiving a first encoding block comprising samples, and the method comprises a step of estimating the frequency $\theta_0(1)$ of the interfering signal contained in the first encoding block received, the step of estimating comprising the following sub-steps:

calculating the Fourier transform of the samples of the first encoding block, determining the moduli of the Fourier transform of the samples of the first encoding block, determining the index of the modulus having the maximum value among the calculated moduli, and considering the determined index to be a function of the frequency $\theta_0(1)$ of the interfering signal of the first encoding block.

In illustrative embodiments, the step of estimating the amplitude and phase of the interfering signal contained in the current encoding block comprises a step of calculating a complex number representing the amplitude and phase of the interfering signal.

In illustrative embodiments, a method for attenuation of an interfering signal contained in a received signal, the method comprising an estimation of an interfering signal contained in the received signal in accordance to the characteristics mentioned above, the method further comprising the following steps:

generating a sinusoidal signal opposite to the estimated interfering signal, adding the generated sinusoidal signal to the received signal.

In illustrative embodiments, a receiving system for receiving a signal for a communication network, the received signal being composed of an interfering signal and a data signal; the interfering signal having a frequency, an amplitude, and a phase; the data signal being modulated, the received signal comprising at least a previous encoding block and a current encoding block, the previous encoding block and the current encoding block comprising a number N of samples, each sample being identified by an index ranging from 0 to N–1;

the receiving system comprising:

a receiving device suitable for receiving the signal, and a device for estimation and attenuation of the interfering signal, comprising:

a frequency estimation unit capable of estimating the frequency $\theta_n(n)$ of the interfering signal contained in the current encoding block as a function of the frequency $\theta_n(n-1)$ of the interfering signal contained in the previous encoding block and of the number N of samples, a phase and amplitude estimation unit for estimating the amplitude and phase of the interfering signal contained in the current encoding block, based on the estimated frequency $\theta_n(n)$ of the interfering signal, a generator capable of generating a sinusoidal signal opposite to the estimated interfering signal (SI), an adder suitable for adding the generated sinusoidal signal to the received signal.

In illustrative embodiments, the received signal is an analog signal, the receiving system comprising:

a conversion device suitable for converting an analog signal to a digital signal, the conversion device being connected to an input of the device for estimation and attenuation.

In illustrative embodiments, the receiving system comprises:

a computing device connected to an output of the device for estimation and attenuation, the computing unit being able to calculate the Fourier transform of the signal delivered by the device for estimation and attenuation, and a decoder connected to the computing unit, the decoder being able to decode the signal delivered by the computing unit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The present disclosure is based on several approximations, explained below.

A first approximation is made in which the interfering signal has the shape of a complex sinusoid. The received signal is thus considered to have the following form:

$$y(t) = \widetilde{A_0} e^{-j2\pi\theta_0 t} + w(t) \tag{1}$$

where:

t is the time in discrete form t=0,1, ..., N–1, y(t) is the received signal, $A_0 e^{-j2\pi\theta_0 t}$ is the interfering sinusoidal signal (SI) in complex form, $\theta_0$ is the frequency of the interfering signal, $\widetilde{A_0}$ is a complex scalar representing the amplitude and phase of the interfering signal, w(t) is the transmitted data signal. Signal w(t) is a digital data signal modulated according to a method such as, for example, a method of orthogonal frequency-division multiplexing and coding generally called an OFDM method.

For example, signal w(t) is modulated according to the DAB, DAB+, DVBT or ISDBT standards which are also based on an OFDM method.

N is the number of samples (i.e. subcarriers) in a blocking block of the transmitted data signal w(t), To estimate the interfering signal SI, the cost function W(A, $\theta$) of the received signal and of the interfering signal is used:

$$W(A,\theta) = \Sigma_t |y(t) - Ae^{-j2\pi\theta t}| \tag{2}$$

There exists a frequency $\theta_0$ of the interfering signal for which the cost function W(A, $\theta$) has its minimum value.

$$\frac{\partial W}{\partial \theta} = 0$$

By solving this equation, we obtain:

$$K(\theta) = \Sigma_u u \gamma^*(u) e^{j2\pi\theta u} \Sigma_t \gamma(t) e^{-j2\pi\theta t} =_0 \tag{3}$$

The function K($\theta$) is the product of the Fourier transform of the received signal, multiplied by the complex conjugate of the derivative of the Fourier transform of the received signal as a function of the frequency.

We define a function $F(\theta)$ equal to the imaginary part of this function $K(\theta)$.

$$F(\theta) = \text{imag}(K(\theta)) \quad (4)$$

A second approximation is made, according to which the interfering signal is dominant. Consequently, in the current encoding block, the function $F(\theta(n))$ has two properties:

The function $F(\theta(n))$ is zero for the frequency $\theta_0$ of the interfering sinusoid of equation (1), i.e. $F(\theta_0)=0$.

The function $F(\theta)$ is considered to be a straight line for frequencies close to frequency $\theta_0$.

Figure 1:
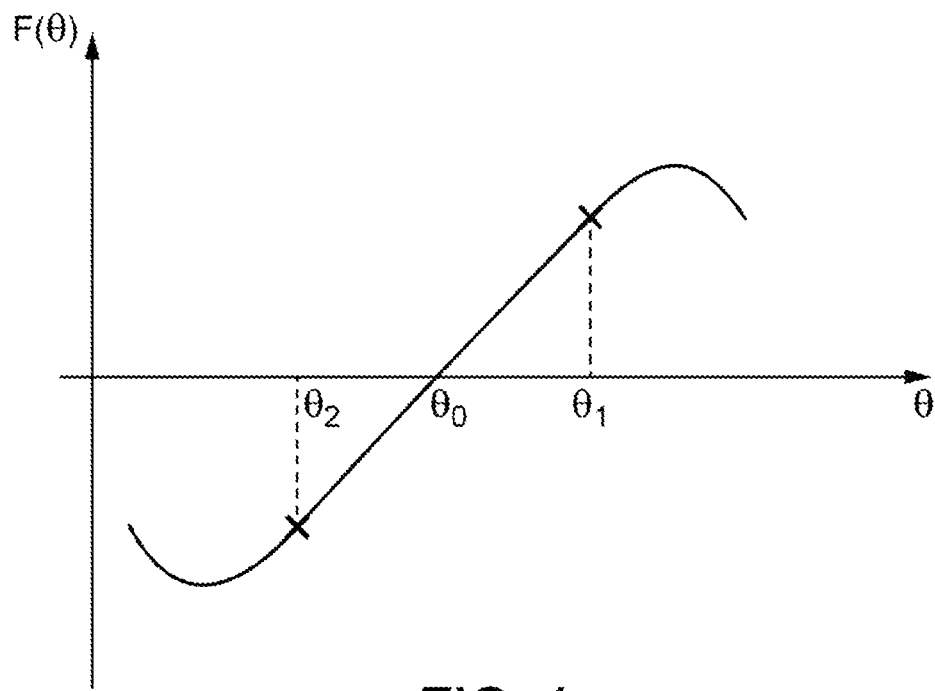
FIG. 1 is a graph representing the imaginary part of the product of the Fourier transform of the received signal, multiplied by the complex conjugate of the derivative of the Fourier transform of the received signal as a function of the frequency.

The function $F(\theta)$ has been represented in FIG. 1 in the vicinity of $\theta_0$. To define this straight line in the vicinity of $\theta_0$, we choose a first frequency $\theta_1$ and a second frequency $\theta_2$ which are close to frequency $\theta_0$.

We will apply an adaptive process to update the estimate of frequency $\theta_0$ (as well as $\theta_1$ and $\theta_2$) at each OFDM symbol received, i.e. $n=1,2,\ldots$.

We choose to define the first frequency $\theta_1(n)$ relative to the frequency $\theta_0(n-1)$ of the interfering signal of the previous encoding block. And, a third approximation is made according to which the first frequency $\theta_1(n)$ is equal to the frequency $\theta_0(n-1)$ of the interfering signal of the previous encoding block plus a first value $\delta_1$.

$$\theta_1(n) = \widehat{\theta_0}(n-1) + \delta_1 \quad (5)$$

The first value $\delta_1$ is, for example, equal to $1/N^2$. The value of $\delta_1$ is in the vicinity of frequency $\theta_0$. For example, the first value $\delta_1$ is determined by the following relation:

$$\delta_1 = \frac{1}{(2N)^2} \quad (6)$$

where N is the number of samples in the data signal $w(t)$. For example, when the data signal is modulated according to the DAB standard, the number N is equal to 2048.

In the same manner, we define the second frequency $\theta_2(n)$ as being equal to the frequency $\theta_0(n-1)$ of the interfering signal of the previous encoding block, minus a second value $\delta_2$.

$$\theta_2(n) = \widehat{\theta_0}(n-1) - \delta_2 \quad (7)$$

The second value $\delta_2$ is, for example, equal to $1/N^2$. For example, the second value $\delta_2$ is determined by the following relation:

$$\delta_2 = \frac{1}{(2N)^2} \quad (8)$$

Alternatively, the first value $\delta_1$ and the second value $\delta_2$ may be different from each other. As the function $F(\theta(n))$ is a straight line, it has the form:

$$y = \alpha x + b \quad (9)$$

The straight line (9) passes through frequencies $\theta_0(n)$, $\theta_1(n)$, and $\theta_2(n)$. By introducing into equation (9) the values of frequencies $\theta_0(n)$, $\theta_1(n)$, and $\theta_2(n)$ defined by equations (5) to (8), we obtain the following relation:

$$\theta_0(n) = \theta_1(n) - F(\theta_1(n)) * \frac{\theta_2(n) - \theta_1(n)}{F(\theta_2(n)) - F(\theta_1(n))} \quad (10)$$

where the symbol * is a multiplication.

This relation makes it possible to define the frequency $\theta_0(n)$ of the interfering signal of the current encoding block n as a function of the frequency of the interfering signal of the previous encoding block n−1.

Advantageously, the estimate of the frequency $\theta_0(n)$ can be improved by using, for example, a forgetting factor according to the formula below:

$$\widehat{\theta_0}(n) = \lambda * \widehat{\theta_0}(n-1) + (1-\lambda) * \theta_0(n)$$

where the symbol * is a multiplication, $\lambda$ is a forgetting factor comprised between 0 and 1, and the complex frequency $\widehat{\theta_0}(0)$ is considered to be equal to the real frequency $\theta_0(n)$.

Figure 4:
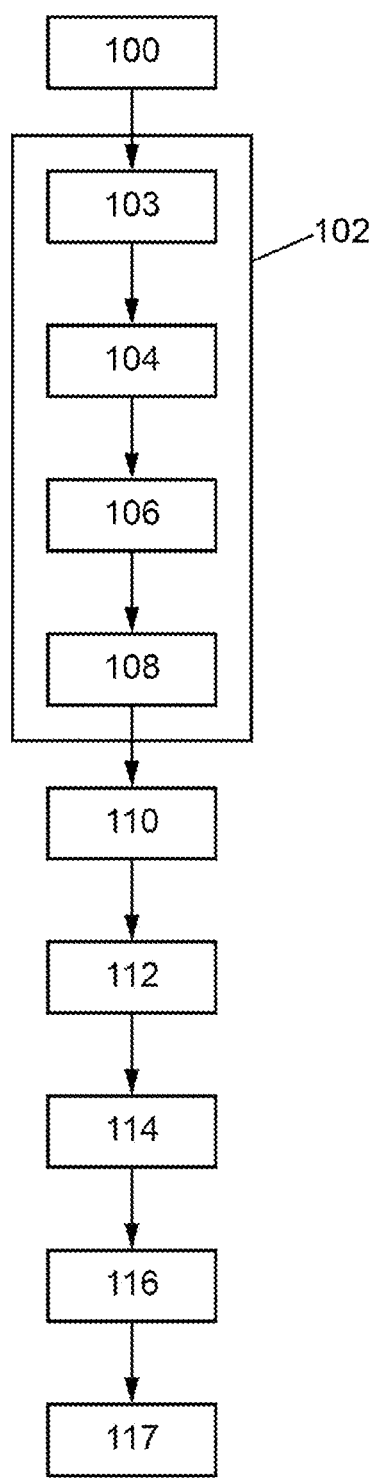
FIG. 4 is a diagram showing the initial steps of the method for estimation and attenuation according to the present disclosure.

This method makes it possible to estimate the interfering signal in a current encoding block based on the frequency of the interfering signal in the previous encoding block. The method for estimation described below in connection with FIG. 4 provides an example of a method for estimation of the frequency $\theta_n(0)$ of the interfering signal of the first encoding block.

There exists a complex number $\widehat{A_0}$ of the interfering signal for which the cost function $W(A, \theta)$ has its minimum value.

$$\frac{\partial W}{\partial A^*} = 0$$

By solving this equation, we obtain:

$$\widehat{A_0} = \frac{1}{N} \sum_k y_k(n) e^{-j2\pi \widehat{\theta_0}(n) \frac{k}{N}}$$

with k varying from 0 to N−1, and where $\widehat{A_0}$ is a complex number representing the amplitude and phase of the interfering signal, N is the number of samples, $\theta_n(n)$ is the frequency of the interfering signal contained in the current encoding block, $y_k(n)$ are the values of the samples of the received signal.

As the frequency $\theta_n(n)$ of the interfering signal has been estimated by the method described above and the values $y_k(n)$ of the samples of the received signal are known, the complex number $\widehat{A_0}$ can be calculated. Its modulus represents the amplitude of the interfering signal.

Figure 2:
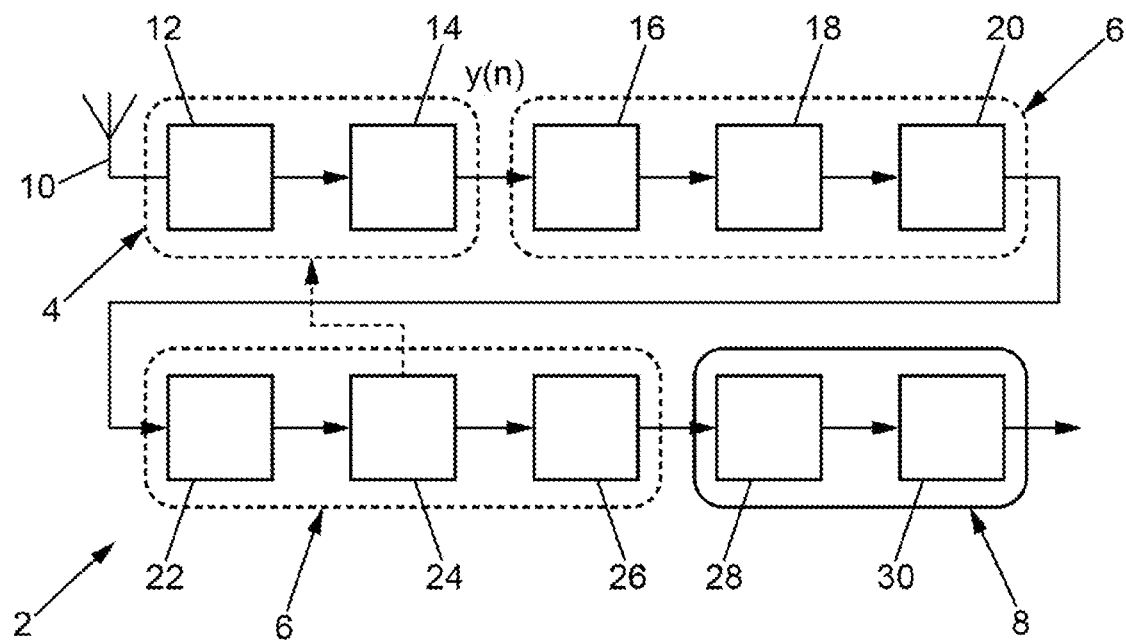
FIG. 2 is a diagram of an exemplary embodiment of a receiving system according to the present disclosure.

Referring to FIG. 2, an example of an embodiment of a receiving system 2 according to the present disclosure is shown. In this example, a receiving system 2 of the type used to receive signals modulated according to the DAB/DAB+ and TDMB standards. This receiving system 2 comprises a receiving and converting device 4 for receiving and converting the signal, a demodulation device 6 for demodulating the baseband signal connected to the receiving device 4, and a decoding device 8 connected to the demodulation device 6.

The receiving and converting device 4 comprises an antenna 10, a receiving device 12 of the signal tuner connected to the antenna 10, and an analog-to-digital converter 14 connected to the receiving device of the signal tuner.

The baseband signal demodulation device 6 comprises:

a device 16 for estimation and attenuation of the parasitic signal, which will be described in detail below, a device 18 for removing the cyclic prefix, connected to the device 16 for estimation and attenuation of the parasitic signal, a computing device 20 suitable for calculating the Fourier transform of the signal delivered by the device for removing the cyclic prefix, a device 22 for estimation of a possible frequency offset and for correction thereof, connected to the computing device 20, a device 24 for estimation of a possible sampling period offset, connected to the device 22 for estimation and correction, a differential decoding device 26 connected to the device 24 for estimation and correction.

Decoding device 8 comprises a channel decoder 28 or a forward error correction decoder (FEC), for example of the "Viterbi" or "Viterbi & Reed-Solomon" type. The decoding device 8 also comprises an audio decoder 30.

The receiving system is implemented in a conventional manner and will not be described in detail. Only the device 16 for estimation and attenuation and its mode of operation are described in detail.

Figure 3:
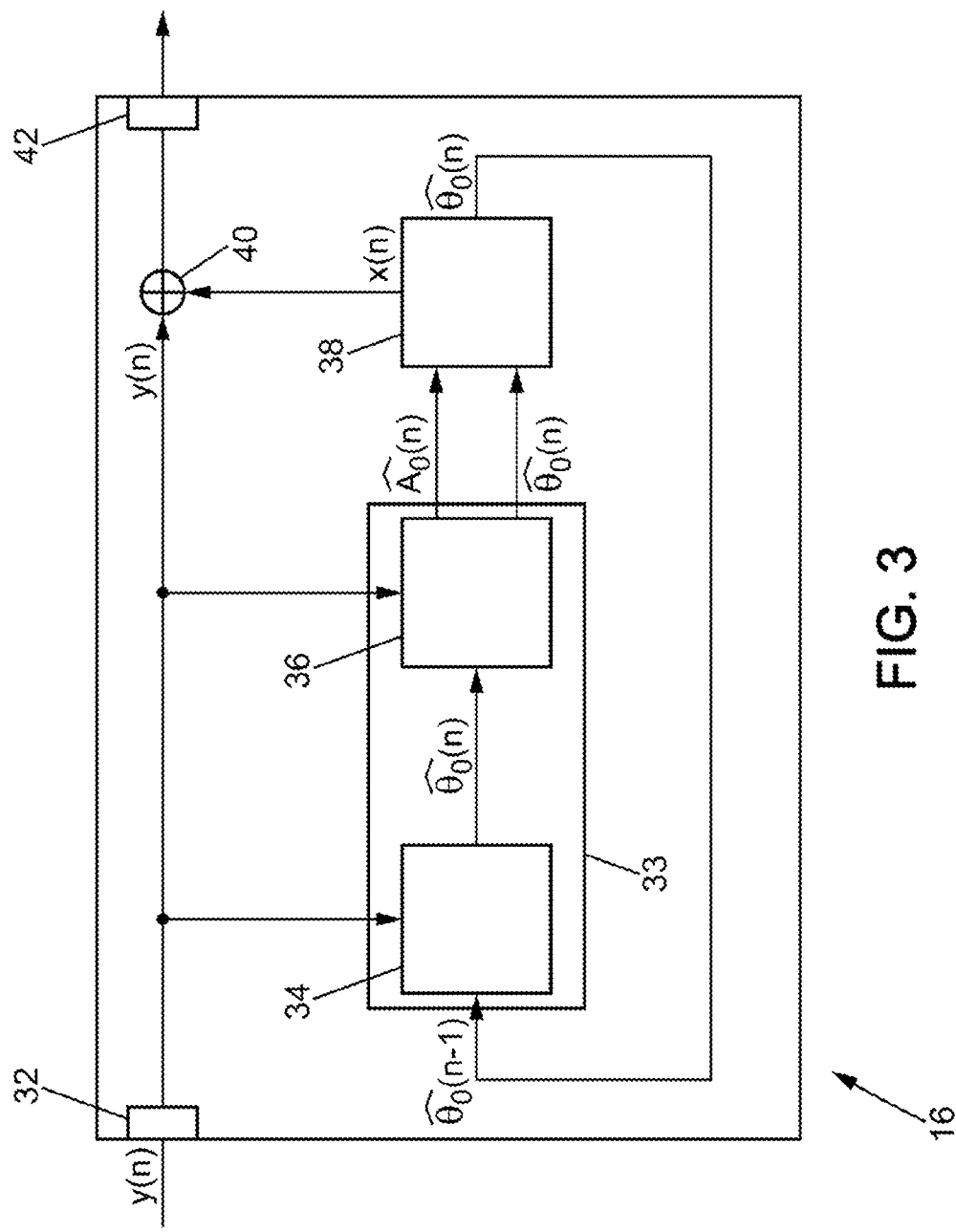
FIG. 3 is a diagram of a device for estimation and attenuation, contained in the receiving system shown in FIG. 2.

Referring to FIG. 3, the device 16 for estimation and attenuation comprises:

an input 32 suitable for receiving the received signal in digital form Y(n), an estimation unit 33 for estimating the interfering signal, connected to the input 32, a generator 38 connected by its input and output to the estimation unit 33, an adder 40 connected to the input 32 and to the generator 38, and an output 42 electrically connected to the adder 40.

The estimation unit 33 is able to estimate the interfering signal contained in the received signal. For this purpose, the estimation unit 33 comprises a frequency estimation unit 34 for estimating the frequency of the interfering signal, connected to input 32, and an amplitude and phase estimation unit 36 for estimating the amplitude and phase of the interfering signal, connected to input 32 and to frequency estimation unit 34. Frequency estimation unit 34 is able to estimate the frequency $\theta_0(n)$ of the interfering signal contained in the first encoding block. Estimation unit 34 is also able to estimate the frequency $\theta_0(n)$ of the interfering signal contained in the current encoding block.

Unit 36 is able to estimate the amplitude and phase of the interfering signal contained in the current encoding block, based on the estimated frequency $\theta_n(n)$ of the interfering signal.

The device 16 for estimation and attenuation of the interfering signal is able to implement a method for attenuation of an interfering signal contained in the received signal.

With reference to FIG. 4, the attenuation method begins with a step 100 of estimation unit 34 receiving a first encoding block from input 32. The first encoding block comprises samples. The encoding symbol, in the form y(0) with the y in bold, of the received signal in the first encoding block is, for example, in the form:

$$y(0) = \begin{bmatrix} y_0(0) \\ y_1(0) \\ y_2(0) \\ y_{N-1}(0) \end{bmatrix}$$

where each sample has the form $\gamma_0(t) = \widehat{A_0} e^{-j2\pi\theta_0 t} + w(t)$, the vector y(0) containing N samples. Each sample is identified by an index ranging from 0 to N−1.

The indices are also called rows.

The method then comprises a step 102 of estimating the frequency $\theta_0(0)$ of the interfering signal of the first encoding block received. For this purpose, the method comprises a sub-step 103 during which the computing device 20 calculates the discrete Fourier transform of the samples of the first encoding block.

In a step 104, the frequency estimation unit 34 determines the moduli of the discrete Fourier transform of the samples of the first encoding block. This determination may, for example, be obtained from calculation of the discrete Fourier transform of the samples received:

$$y_k(0) = \frac{1}{N} \sum_{n=0}^{N-1} y_n(0) e^{-j2\pi \frac{kn}{N}}$$

$$k = 0, 1, \ldots, n-1$$

$$Y(0) = \begin{bmatrix} Y_0(0) \\ Y_1(0) \\ Y_2(0) \\ Y_{N-1}(0) \end{bmatrix}$$

then calculating the modulus of the complex numbers $Y_k(0)$ for k=0, . . . ,N−1

$$|Y(0)| = \begin{bmatrix} |Y_0(0)| \\ |Y_1(0)| \\ |Y_2(0)| \\ |Y_{N-1}(0)| \end{bmatrix}.$$

In the present patent application, if z is a complex number, it is expressed in the form:

z=a+jb where a is the real part and b is the imaginary part. The modulus of the complex number z is calculated as:

$$|z| = \sqrt{a^2 + b^2}$$

During a sub-step 106, the modulus having the maximum value among the moduli calculated during sub-step 104 is determined.

During a sub-step 108, the index of the modulus having the maximum value is determined. The frequency $\theta_n(0)$ of the interfering signal of the first encoding block is a function of the determined index. In particular, the frequency $\theta_n(0)$ of the interfering signal is equal to the determined index divided by the number N of samples. For example, the value $|Y_4(0)|$ is the modulus having the maximum value. The index of the block of N samples for which the modulus is maximum will give us the initial frequency ($\theta_0(0)$) of the interfering signal. For our example, $\theta_0(0)=4/N$ in normalized frequency. The frequency $\theta_0(0)$ of the interfering signal is sent from the frequency estimation unit 34 to the amplitude and phase estimation unit 36.

During a step 110, the amplitude and phase estimation unit 36 receives the first encoding block from input 32. The amplitude and phase estimation unit 36 estimates the amplitude and phase of the interfering signal contained in this first encoding block. For this purpose, the estimation unit 36 calculates the following formula:

$$\widehat{A_0} = \frac{1}{N}\sum_k y_k(0)e^{-j2\pi\widehat{\theta_0}(0)\frac{k}{N}} \quad (10)$$

where $\widehat{A_0}$ is a complex number representing the amplitude and phase of the interfering signal contained in the first encoding block, N is the number of samples, $\theta_0(0)$ is the frequency of the interfering signal contained in the first encoding block, $y_k(n)$ are the samples of the first encoding block of the received signal.

Then, the frequency $\theta_0(0)$ and the complex number $\widehat{A_0}$ are sent to the generator 38.

During a step 112, the generator 38 generates a sinusoidal signal SI' opposite to the interfering signal, based on the frequency $\theta_0(0)$ and the complex number $\widehat{A_0}$ received from the estimation unit 36. The generator 38 sends this opposite sinusoidal signal SI' to the adder 40. The sinusoidal signal SI' has, for example, a phase and a frequency respectively opposite to the estimated phase and estimated frequency. For example, the sinusoidal signal SI' also has an amplitude opposite to the estimated amplitude.

During a step 114, the generator 38 transmits frequency $\theta_0(0)$ to the frequency estimation unit 34. This frequency $\theta_0(0)$ is used as the frequency of the interfering signal of the previous encoding block, for estimating the frequency of the interfering signal of the second encoding block.

During a step 116, the adder 40 adds the signal received in the first encoding block, to the opposite sinusoidal signal generated by the generator 38. The interfering signal contained in the received signal is thus attenuated. It can even be eliminated when the estimation unit 33 has estimated an exact value of the interfering signal.

The method may also include a step 117 during which the signal delivered by the adder is normalized to avoid degradation of the decoding of the channels.

Figure 6:
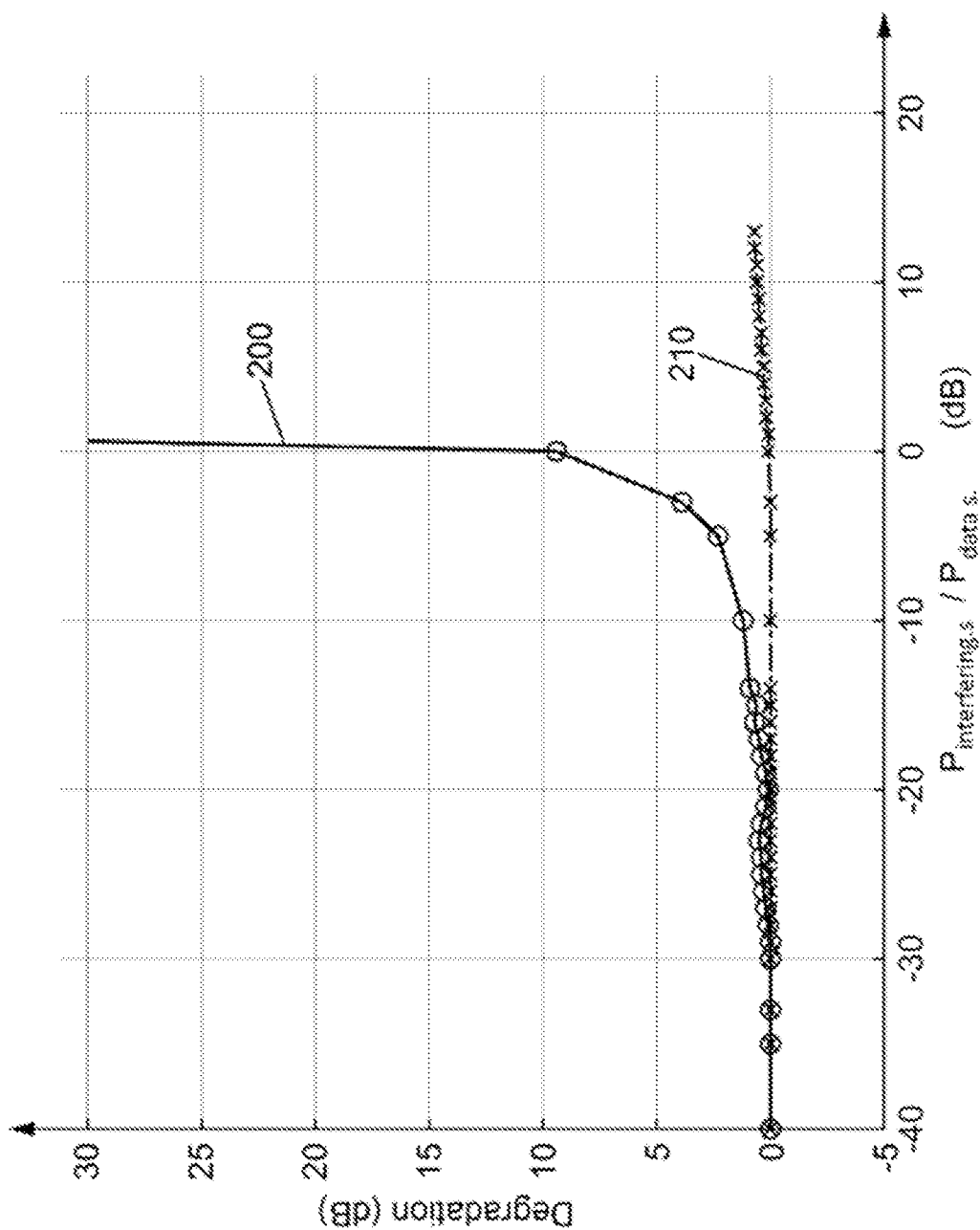
FIG. 6 is a graph which represents the degradation of performance as a function of the ratio of the power of the interfering signal to the power of the data signal.

When receiving the next encoding blocks, the method for estimation implements the steps of the diagram shown in FIG. 6.

During a step 118, estimation unit 33 receives a current encoding block of the received signal, the current encoding block coming from input 32.

During a step 120, implemented by frequency estimation unit 34, the frequency $\theta_n(n)$ of the interfering signal contained in the current encoding block is estimated as a function of the frequency $\theta_n(n-1)$ of the interfering signal contained in the previous encoding block and of the number N of samples. Thus, upon reception of the second encoding block y(1), the previous encoding block is the first encoding block y(0).

The current encoding block is the second encoding block y(1).

Step 120 comprises a sub-step 122 of setting a first frequency $\theta_1(n)$ of the interfering signal contained in the current encoding block. The first frequency $\theta_1(n)$ is defined as a function of the frequency $\theta_0(n-1)$ of the interfering signal contained in the previous encoding block.

The first frequency $\theta_1(n)$ is, for example, equal to the frequency $\theta_0(n-1)$ of the interfering signal of the previous encoding block, plus a first value $\delta_1$, the first value $\delta_1$ being less than 1/N, for example less than ½N.

Advantageously, the first value $\delta_1$ is determined by the following relation:

$$\delta_1 = \frac{1}{(2N)^2}$$

During a sub-step 124, frequency estimation unit 34 calculates the function $F(\theta_1(n))$ according to the formula below, for the current encoding block:

$$F(\theta_1(n))=\text{imag}(\Sigma_u u y^*(u)e^{j2\pi\theta_1(n)u}\Sigma_t y(t)e^{-j2\pi\theta_1(n)t})$$

The function $F(\theta_1(n))$ is the imaginary part of the product of the Fourier transform of the signal received at the first frequency, multiplied by the complex conjugate of the derivative of the Fourier transform of the signal received at the first frequency. The signal y(t) is the received signal.

During a sub-step 126, a second frequency $\theta_2(n)$ is set. This second frequency $\theta_2(n)$ is contained in the current encoding block. It is set as a function of the frequency $\theta_0(n-1)$ of the interfering signal contained in the previous encoding block. The second frequency $\theta_2(n)$ is different from the first frequency $\theta_1(n)$. The second frequency $\theta_2(n)$ is for example equal to the frequency $\theta_0(n-1)$ of the interfering signal of the previous encoding block plus a second value $\delta_2$, the second value $\delta_2$ being less than 1/N, for example less than ½N. The second value $\delta_2$ is for example equal to the first value $\delta_1$.

During a sub-step 128, the function $F(\theta_2(n))$ is calculated for the current encoding block according to the following formula:

$$F(\theta_2(n))=\text{imag}(\Sigma_u u y^*(u)e^{j2\pi\theta_2(n)u}\Sigma_t y(t)e^{-j2\pi\theta_2(n)t})$$

The function $F(\theta_2(n))$ is the imaginary part of the product of the Fourier transform of the signal received at the second frequency, multiplied by the complex conjugate of the derivative of the Fourier transform of the signal received at the second frequency.

Finally, during a sub-step 130, the frequency $\theta_0(n)$ of the interfering signal contained in the current encoding block is calculated by estimation unit 34, based on the following relation:

$$\theta_0(n) = \theta_1(n) - F(\theta_1(n)) * \frac{\theta_2(n) - \theta_1(n)}{F(\theta_2(n)) - F(\theta_1(n))}$$

where the symbol * is a multiplication.

Advantageously, the step of estimating the frequency of the interfering signal contained in the current encoding block may comprise a sub-step 132 of applying a forgetting factor to the frequency $\theta_0(n)$ calculated during sub-step 130. This step may, for example, comprise the calculation of the relation below:

$$\widehat{\theta_0}(n)=\lambda * \widehat{\theta_0}(n-1)+(1-\lambda)*\theta_0(n)$$

where:

$\lambda$ is a forgetting factor comprised between 0 and 1, and the complex frequency $\widehat{\theta_0}(0)$ is considered to be equal to the real frequency $\theta_0(n)$.

When step 120 is completed, estimation unit 33 transmits the frequency of the interfering signal to amplitude and phase estimation unit 36.

During a step 134, amplitude and phase estimation unit 36 receives the current encoding block from input 32 and estimates the amplitude and phase of the interfering signal contained in the current encoding block. For this purpose, estimation unit 36 calculates the following formula:

$$\widehat{A_0} = \frac{1}{N}\sum_k y_k(n) e^{-j2\pi\theta_0(n)\frac{k}{N}}$$

where $\widehat{A_0}$ is a complex number representing the amplitude and phase of the interfering signal, N is the number of samples, $\theta_0(n)$ is the frequency of the interfering signal contained in the current encoding block, $y_k(n)$ are the samples of the current encoding block of the received signal.

Then, the frequency $\theta_0(n)$ and the complex number $\widehat{A_0}$ are sent to the generator 38.

Steps 112 to 117 are then implemented for the current encoding block by the generator 38 and the adder 40. These steps have been described with reference to FIG. 4 and will not be described again.

The present disclosure also relates to a method for estimation of the interfering signal contained in a received signal. This method for estimation is implemented by estimation unit 33.

Figure 5:
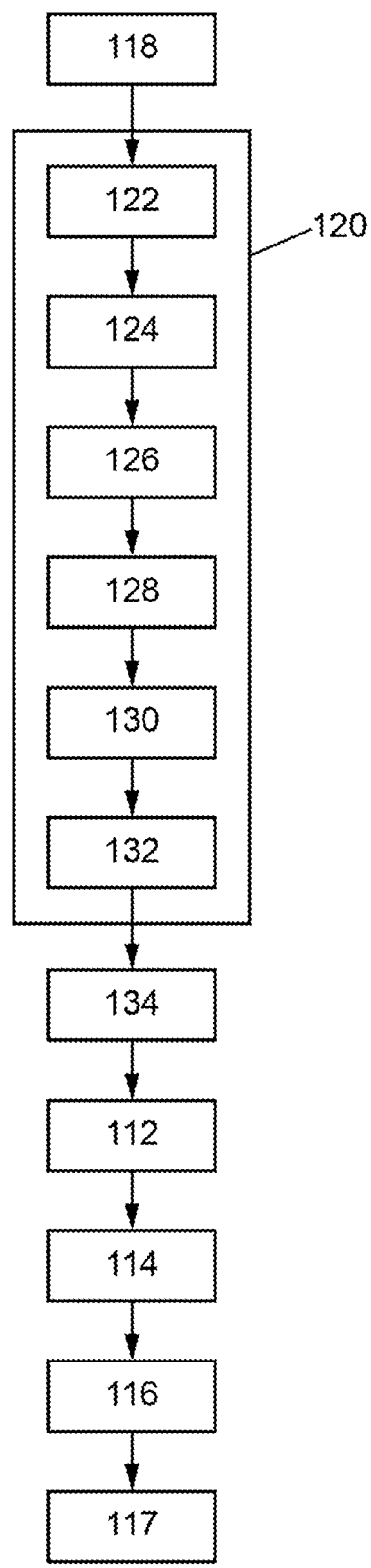
FIG. 5 is a diagram showing the subsequent steps of the method for estimation and attenuation according to the present disclosure.

This method comprises steps 100, 104, 106, 108, and 110 illustrated in FIG. 4, and steps 118, 122, 124, 126, 128, 130, 132, and 134 illustrated in FIG. 5. These steps will not be described again in detail.

The method according to the present disclosure was tested with a data signal modulated according to the DAB standard. An interfering signal and Gaussian white noise were added to this data signal. FIG. 6 shows the degradation in performance as a function of the ratio of the power of the interfering signal to the power of the data signal. In this graph, curve 200 represents the degradation in performance of the signal when the method for estimation and attenuation is not implemented. Curve 210 represents the degradation in performance of the signal when the method for estimation and attenuation is implemented.

As can be seen in this figure, there is practically no degradation in performance during implementation of the method for estimation and attenuation according to the present disclosure, even when the power of the interfering signal is 13 decibels more than the power of the data signal. When the method of the present disclosure is not implemented (curve 200), the degradation in the data signal is visible even when the interfering signal is ten times weaker than the data signal. When the interfering signal has the same power as the data signal, performance is degraded by about 10 decibels (see curve 200).

The present disclosure relates to the field of digital broadcasting via radio waves, by terrestrial means or by satellite.

In particular, the present disclosure relates to the reception of a digital radio signal, a digital television signal, an analog radio signal, or a digital communications signal (4G, 5G).

More particularly, the present disclosure relates to the reception of a signal. In particular, the present disclosure relates to the reception of a digital signal modulated by modulation methods such as the modulation methods according to the DAB or DAB+("Digital Audio Broadcasting") standards used for digital terrestrial audio broadcasting, or according to the DVBT or ISDBT ("Integrated Services Digital Broadcasting") standards used for digital terrestrial television broadcasting, or according to the TDMB ("Terrestrial Digital Multimedia Broadcasting") standard.

The present disclosure finds applications, among others, in systems implementing modulation techniques of types such as OFDM ("Orthogonal Frequency Division Multiplex"), OFDMA ("Orthogonal Frequency Division Multiple Access"), C-OFDM (Coded-Orthogonal Frequency Division Multiplex), MC-CDMA ("Multi-Carrier Coded Division Multiple Access"), IFDMA ("Interleaved Frequency Division Multiple Access"), and LP-OFDM ("Linear Precoded Orthogonal Frequency Division Multiplex").

When transmitting digital signals, interfering signals may be added to the transmitted digital signal. These interfering signals degrade the quality of the sound and/or images received. This degradation phenomenon can be particularly annoying to the user when the power of the received signal is low.

The present disclosure provides a new method making it possible to estimate the interfering signal contained in the received data signal, and to at least partially cancel it out in order to improve the quality of the sound and/or images received.

An object of the present disclosure is a method for estimation of an interfering signal (SI) of a signal received by a receiving system, the received signal comprising the interfering signal and a modulated data signal, the received signal comprising at least a previous encoding block and a current encoding block, the previous encoding block and the current encoding block comprising a number N of samples, each sample being identified by an index ranging from 0 to N−1, the method comprising the following steps:

estimating the frequency $\theta_0(n)$ of the interfering signal contained in the current encoding block as a function of the frequency $\theta_0(n-1)$ of the interfering signal contained in the previous encoding block and of the number N of samples of the current block, and estimating the amplitude and phase of the interfering signal contained in the current encoding block, based on the estimated frequency $\theta_0(n)$ of the interfering signal.

Advantageously, this method is simple to implement. It uses little computing power. It considerably improves the quality of the digital signals received, in particular when these signals have been modulated according to the DAB, DAB+ and DVBT or ISDBT standards.

Advantageously, this method provides a high precision in estimating the frequency of the interfering signal.

Advantageously, this method makes it possible to monitor the frequency of the interfering signal even when this frequency varies over time (for example when the electronic chip becomes hot).

Advantageously, this method does not cause significant degradation of the data signal even when no interfering signal is present or even in the case where the interfering signal is much stronger than the data signal.

For example, the step of estimating the frequency $\theta_n(n)$ of the interfering signal contained in the current encoding block comprises the following steps for the current encoding block:

setting a first frequency $\theta_1(n)$ of the interfering signal contained in the current encoding block as a function of the frequency $\theta_0(n-1)$ of the interfering signal contained in the previous encoding block, the first frequency $\theta_1(n)$ being equal to the frequency $\theta_0(n-1)$ of the interfering signal of the previous encoding block plus a first value $\delta_1$, the first value $\delta_1$ being less than 1/N, for example less than ½N;

setting a second frequency $\theta_2(n)$ of the interfering signal contained in the current encoding block as a function of the frequency $\theta_0(n-1)$ of the interfering signal contained in the previous encoding block, the second frequency $\theta_2(n)$ being different from the first frequency $\theta_1(n)$, the second frequency $\theta_2(n)$ being equal to the frequency $\theta_0(n-1)$ of the interfering signal of the previous encoding block minus a second value $\delta_2$, the second value $\delta_2$ being less than 1/N, for example less than ½N;

calculating the frequency $\theta_0(n)$ of the interfering signal contained in the current encoding block as a function of the first frequency $\theta_1(n)$ and of the second frequency $\theta_2(n)$.

For example, the step of calculating the frequency $\theta_0(n)$ comprises the following steps:

calculating the imaginary part of a first product as a function of the Fourier transform of the signal received at the first frequency, calculating the imaginary part of a second product as a function of the Fourier transform of the signal received at the second frequency; and the frequency $\theta_0(n)$ is a function of the imaginary part of the first product and of the imaginary part of the second product.

For example, the first product is the product of the Fourier transform of the received signal at the first frequency, and of the complex conjugate of the derivative of the Fourier transform of the signal received at the first frequency; and the second product is the product of the Fourier transform of the signal received at the second frequency, and of the complex conjugate of the derivative of the Fourier transform of the signal received at the second frequency.

For example, the method further comprises a sub-step (132) during which the frequency $\theta_0(n)$ of the calculated interfering signal is averaged by a forgetting factor based on the relation:

$$\widehat{\theta_0}(n)=\lambda * \widehat{\theta_0}(n-1)+(1-\lambda)*\theta_0(n)$$

where:

$\lambda$ is a forgetting factor comprised between 0 and 1, and the complex frequency $\widehat{\theta_0}(n)$ is considered to be the estimated value of the real frequency $\theta_0(n)$.

For example, the first value $\delta_1$ is determined by the following relation:

$$\delta_1 = \frac{1}{(2N)^2}$$

For example, the second value $\delta_2$ is determined by the following relation:

$$\delta_2 = \frac{1}{(2N)^2}$$

For example, the method comprises an initial step of receiving a first encoding block comprising samples, and the method comprises a step of estimating the frequency $\theta_0(1)$ of the interfering signal contained in the first encoding block received, the step of estimating comprising the following sub-steps:

calculating the Fourier transform of the samples of the first encoding block, determining the moduli of the Fourier transform of the samples of the first encoding block, determining the index of the modulus having the maximum value among the calculated moduli, and considering the determined index to be a function of the frequency $\theta_0(1)$ of the interfering signal of the first encoding block.

For example, the step of estimating the amplitude and phase of the interfering signal contained in the current encoding block comprises a step of calculating a complex number representing the amplitude and phase of the interfering signal.

An object of the present disclosure is a method for attenuation of an interfering signal contained in a received signal, the method comprising an estimation of an interfering signal contained in the received signal in accordance to the characteristics mentioned above, the method further comprising the following steps:

generating a sinusoidal signal opposite to the estimated interfering signal, adding the generated sinusoidal signal to the received signal.

Another object of the present disclosure is a receiving system for receiving a signal for a communication network, the received signal being composed of an interfering signal and a data signal; the interfering signal having a frequency, an amplitude, and a phase; the data signal being modulated, the received signal comprising at least a previous encoding block and a current encoding block, the previous encoding block and the current encoding block comprising a number N of samples, each sample being identified by an index ranging from 0 to N−1;

the receiving system comprising:

a receiving device suitable for receiving the signal, and a device for estimation and attenuation of the interfering signal, comprising:

a frequency estimation unit capable of estimating the frequency $\theta_n(n)$ of the interfering signal contained in the current encoding block as a function of the frequency $\theta_n(n-1)$ of the interfering signal contained in the previous encoding block and of the number N of samples, a phase and amplitude estimation unit for estimating the amplitude and phase of the interfering signal contained in the current encoding block, based on the estimated frequency $\theta_n(n)$ of the interfering signal, a generator capable of generating a sinusoidal signal opposite to the estimated interfering signal (SI), an adder suitable for adding the generated sinusoidal signal to the received signal.

For example, the received signal is an analog signal, the receiving system comprising:

a conversion device suitable for converting an analog signal to a digital signal, the conversion device being connected to an input of the device for estimation and attenuation.

For example, the receiving system comprises:

a computing device connected to an output of the device for estimation and attenuation, the computing unit being able to calculate the Fourier transform of the signal delivered by the device for estimation and attenuation, and a decoder connected to the computing unit, the decoder being able to decode the signal delivered by the computing unit.

The present disclosure relates to a method for estimation of an interfering signal of a signal received by a receiving system, the received signal comprising the interfering signal and a modulated data signal, the received signal comprising a previous encoding block and a current encoding block, each encoding block comprising a number N of samples, the method comprising the following steps:

estimating (120) the frequency $\theta_0(n)$ of the interfering signal contained in the current encoding block, as a function of the frequency $\theta_0(n-1)$ of the interfering signal contained in the previous encoding block and of the number N of samples of the current block, and estimating (134) the amplitude and phase of the interfering signal contained in the current encoding block, based on the estimated frequency $\theta_0(n)$ of the interfering signal.

The present disclosure also relates to a method for attenuation of an interfering signal contained in a received signal, and a receiving system.

The following numbered clauses include embodiments that are contemplated and non-limiting:

Clause 1. A method for estimation of an interfering signal (SI) of a signal received by a receiving system, the received signal comprising the interfering signal and a modulated data signal, the received signal comprising at least a previous encoding block and a current encoding block, the previous encoding block and the current encoding block comprising a number N of samples, each sample being identified by an index ranging from 0 to N−1, the method comprising the following steps:

estimating (120) the frequency $\theta_0(n)$ of the interfering signal contained in the current encoding block, as a function of the frequency $\theta_0(n-1)$ of the interfering signal contained in the previous encoding block and of the number N of samples of the current block, and estimating (110,134) the amplitude and phase of the interfering signal contained in the current encoding block, based on the estimated frequency $\theta_0(n)$ of the interfering signal.

Clause 2. The method for estimation according to clause 1, wherein the step of estimating (110) the frequency $\theta_0(n)$ of the interfering signal contained in the current encoding block comprises the following steps for the current encoding block:

setting (122) a first frequency $\theta_1(n)$ of the interfering signal contained in the current encoding block as a function of the frequency $\theta_0(n-1)$ of the interfering signal contained in the previous encoding block, the first frequency $\theta_1(n)$ being equal to the frequency $\theta_0(n-1)$ of the interfering signal of the previous encoding block plus a first value $\delta_1$, the first value $\delta_1$ being less than 1/N, for example less than 1/2N;

setting (126) a second frequency $\theta_2(n)$ of the interfering signal contained in the current encoding block as a function of the frequency $\theta_0(n-1)$ of the interfering signal contained in the previous encoding block, the second frequency $\theta_2(n)$ being different from the first frequency $\theta_1(n)$, the second frequency $\theta_2(n)$ being equal to the frequency $\theta_0(n-1)$ of the interfering signal of the previous encoding block minus a second value $\delta_2$, the second value $\delta_2$ being less than 1/N, for example less than 1/2N;

calculating (130) the frequency $\theta_0(n)$ of the interfering signal contained in the current encoding block as a function of the first frequency $\theta_1(n)$ and of the second frequency $\theta_2(n)$.

Clause 3. The method for estimation according to clause 2, wherein the step of calculating (130) the frequency $\theta_0(n)$ comprises the following steps:

calculating (124) the imaginary part of a first product $F(\theta_1(n))$ as a function of the Fourier transform of the signal received at the first frequency, calculating (128) the imaginary part of a second product $F(\theta_2(n))$ as a function of the Fourier transform of the signal received at the second frequency;

and wherein the frequency $\theta_0(n)$ is a function of the imaginary part of the first product $F(\theta_1(n))$ and of the imaginary part of the second product $F(\theta_2(n))$.

Clause 4. The method for estimation according to clause 3, wherein the first product $F(\theta_1(n))$ is the product of the Fourier transform of the received signal at the first frequency, and of the complex conjugate of the derivative of the Fourier transform of the signal received at the first frequency, and wherein the second product $F(\theta_2(n))$ is the product of the Fourier transform of the signal received at the second frequency, and of the complex conjugate of the derivative of the Fourier transform of the signal received at the second frequency.

Clause 5. The method for estimation according to any one of clauses 2 to 4, which further comprises a sub-step (132) during which the frequency $\theta_0(n)$ of the calculated interfering signal is averaged by a forgetting factor based on the relation:

$$\widehat{\theta_0}(n) = \lambda * \widehat{\theta_0}(n-1) + (1-\lambda)*\theta_0(n)$$

where:
$\lambda$ is a forgetting factor comprised between 0 and 1, and
the complex frequency $\widehat{\theta_0}(n)$ is considered to be the estimated value of the real frequency $\theta_0(n)$.

Clause 6. The method for estimation according to any one of clauses 2 to 4, wherein the first value $\delta_1$ is determined by the following relation:

$$\delta_1 = \frac{1}{(2N)^2}$$

Clause 7. The method for estimation according to any one of clauses 2 to 6, wherein the second value $\delta_2$ is determined by the following relation:

$$\delta_2 = \frac{1}{(2N)^2}$$

Clause 8. The method for estimation according to any one of clauses 1 to 7, comprising an initial step of receiving (100) a first encoding block comprising samples, and wherein the method comprises a step (102) of estimating the frequency $\theta_0(1)$ of the interfering signal contained in the first encoding block received, the step of estimating comprising the following sub-steps:

calculating (103) the Fourier transform of the samples of the first encoding block, determining (104) the moduli of the Fourier transform of the samples of the first encoding block, determining (106) the index of the modulus having the maximum value among the calculated moduli, and considering (108) the determined index to be a function of the frequency $\theta_0(1)$ of the interfering signal of the first encoding block.

Clause 9. The method for estimation according to any one of clauses 1 to 7, wherein the step of estimating (110, 134) the amplitude and phase of the interfering signal contained in the current encoding block comprises a step of calculating a complex number $\widehat{A_0}$ representing the amplitude and phase of the interfering signal.

Clause 10. The method for attenuation of an interfering signal (SI) of a received signal, the method comprising an estimation of an interfering signal (SI) contained in the received signal according to any one of clauses 1 to 8, the method further comprising the following steps:
generating (112) a sinusoidal signal (SI') opposite to the estimated interfering signal (SI),
adding (116) the generated sinusoidal signal (SI') to the received signal.

Clause 11. A receiving system (2) for receiving a signal for a communication network, the received signal being composed of an interfering signal (SI) and a data signal; the interfering signal having a frequency, an amplitude, and a phase; the data signal being modulated, the received signal comprising at least a previous encoding block and a current encoding block, the previous encoding block and the current encoding block comprising a number N of samples, each sample being identified by an index ranging from 0 to N−1; the receiving system comprising:
a receiving device (4) suitable for receiving the signal, and
a device (16) for estimation and attenuation of the interfering signal (IS), comprising:
a frequency estimation unit (34) capable of estimating the frequency $\theta_n(n)$ of the interfering signal (SI) contained in the current encoding block as a function of the frequency $\theta_n(n-1)$ of the interfering signal contained in the previous encoding block and of the number N of samples,
a phase and amplitude estimation unit (36) for estimating the amplitude and phase of the interfering signal (SI) contained in the current encoding block, based on the estimated frequency $\theta_n(n)$ of the interfering signal,
a generator (38) capable of generating a sinusoidal signal (SI') opposite to the estimated interfering signal (SI),
an adder (40) suitable for adding the generated sinusoidal signal (SI') to the received signal.

Clause 12. The receiving system according to clause 11, wherein the received signal is an analog signal, the receiving system comprising:
a conversion device (14) suitable for converting an analog signal to a digital signal, the conversion device (14) being connected to an input (32) of the device (16) for estimation and attenuation.

Clause 13. The receiving system according to clause 11 or 12, wherein the receiving system comprises:
a computing device (20) connected to an output of the device (16) for estimation and attenuation, the computing unit (20) being able to calculate the Fourier transform of the signal delivered by the device for estimation and attenuation, and
a decoder (28, 30) connected to the computing unit, the decoder being able to decode the signal delivered by the computing unit.

The invention claimed is:

1. A method for estimation of an interfering signal of a signal received by a receiving system, the received signal comprising the interfering signal and a modulated data signal, the received signal comprising at least a previous encoding block and a current encoding block, the previous encoding block and the current encoding block comprising a number N of samples, each sample being identified by an index ranging from 0 to N−1, the method comprising the following steps:
estimating a frequency $\theta_0(n)$ of the interfering signal contained in the current encoding block, as a function of the frequency $\theta_0(n-1)$ of the interfering signal contained in the previous encoding block and of the number N of samples of the current encoding block, and
estimating an amplitude and a phase of the interfering signal contained in the current encoding block, based on the estimated frequency $\theta_0(n)$ of the interfering signal.

2. The method of claim 1, wherein the step of estimating the frequency $\theta_0(n)$ of the interfering signal contained in the current encoding block comprises the following steps for the current encoding block:
setting a first frequency $\theta_1(n)$ of the interfering signal contained in the current encoding block as a function of the frequency $\theta_0(n-1)$ of the interfering signal contained in the previous encoding block, the first frequency $\theta_1(n)$ being equal to the frequency $\theta_0(n-1)$ of the interfering signal of the previous encoding block plus a first value $\delta_1$, the first value $\delta_1$ being less than 1/N, for example less than 1/2N;
setting a second frequency $\theta_2(n)$ of the interfering signal contained in the current encoding block as a function of the frequency $\theta_0(n-1)$ of the interfering signal contained in the previous encoding block, the second frequency $\theta_2(n)$ being different from the first frequency $\theta_1(n)$, the second frequency $\theta_2(n)$ being equal to the frequency $\theta_0(n-1)$ of the interfering signal of the previous encoding block minus a second value $\delta_2$, the second value $\delta_2$ being less than 1/N, for example less than 1/2N;
calculating the frequency $\theta_0(n)$ of the interfering signal contained in the current encoding block as a function of the first frequency $\theta_1(n)$ and of the second frequency $\theta_2(n)$.

3. The method of claim 2, wherein the step of calculating the frequency $\theta_0(n)$ comprises the following steps:
calculating an imaginary part of a first product $F(\theta_1(n))$ as a function of a Fourier transform of the signal received at the first frequency $\theta_1(n)$,
calculating the imaginary part of a second product $F(\theta_2(n))$ as a function of the Fourier transform of the signal received at the second frequency $\theta_2(n)$;
and wherein the frequency $\theta_0(n)$ is a function of the imaginary part of the first product $F(\theta_1(n))$ and of the imaginary part of the second product $F(\theta_2(n))$.

4. The method of claim 3, wherein the first product $F(\theta_1(n))$ is the product of the Fourier transform of the received signal at the first frequency $\theta_1(n)$, and of a complex conjugate of a derivative of the Fourier transform of the signal received at the first frequency $\theta_1(n)$, and wherein the second product $F(\theta_2(n))$ is the product of the Fourier transform of the signal received at the second frequency $\theta_2(n)$, and of the complex conjugate of the derivative of the Fourier transform of the signal received at the second frequency $\theta_2(n)$.

5. The method of claim 2, which further comprises a sub-step during which the frequency $\theta_0(n)$ of the calculated interfering signal is averaged by a forgetting factor based on the relation:

$$\widehat{\theta_0}(n) = \lambda * \widehat{\theta_0}(n-1) + (1-\lambda) * \theta_0(n)$$

where:
$\lambda$ is a forgetting factor comprised between 0 and 1, and
a complex frequency $\widehat{\theta_0}(n)$ is considered to be an estimated value of the real frequency $\theta_0(n)$.

6. The method of claim 2, wherein the first value $\delta_1$ is determined by the following relation:

$$\delta_1 = \frac{1}{(2N)^2}.$$

7. The method of claim 2, wherein the second value $\delta_2$ is determined by the following relation:

$$\delta_2 = \frac{1}{(2N)^2}.$$

8. The method of claim 1, comprising an initial step of receiving a first encoding block comprising samples, and wherein the method comprises a step of estimating the frequency $\theta_0(1)$ of the interfering signal contained in the first encoding block received, the step of estimating comprising the following sub-steps:
- calculating a Fourier transform of the samples of the first encoding block,
- determining a moduli of the Fourier transform of the samples of the first encoding block,
- determining an index of a modulus having the maximum value among the calculated moduli, and
- considering the determined index to be a function of the frequency $\theta_0(1)$ of the interfering signal of the first encoding block.

9. The method of claim 1, wherein the step of estimating the amplitude and the phase of the interfering signal contained in the current encoding block comprises a step of calculating a complex number $\widehat{A_0}$ representing the amplitude and the phase of the interfering signal.

10. A method for attenuation of an interfering signal (SI) of a received signal, the method comprising an estimation of an interfering signal (SI) contained in the received signal according to claim 1, the method further comprising the following steps:
- generating a sinusoidal signal (SI') opposite to the estimated interfering signal (SI),
- adding the generated sinusoidal signal (SI') to the received signal.

11. A receiving system for receiving a signal for a communication network, the received signal being composed of an interfering signal (SI) and a data signal; the interfering signal having a frequency, an amplitude, and a phase; the data signal being modulated, the received signal comprising at least a previous encoding block and a current encoding block, the previous encoding block and the current encoding block comprising a number N of samples, each sample being identified by an index ranging from 0 to N−1; the receiving system comprising:
- a receiving device suitable for receiving the signal, and
- a device for estimation and attenuation of the interfering signal (IS), comprising:
  - a frequency estimation unit capable of estimating a frequency $\theta_n(n)$ of the interfering signal (SI) contained in the current encoding block as a function of a frequency $\theta_n(n-1)$ of the interfering signal contained in the previous encoding block and of the number N of samples,
  - a phase and amplitude estimation unit for estimating the amplitude and the phase of the interfering signal (SI) contained in the current encoding block, based on the estimated frequency $\theta_n(n)$ of the interfering signal,
  - a generator capable of generating a sinusoidal signal (SI') opposite to the estimated interfering signal (SI),
  - an adder suitable for adding the generated sinusoidal signal (SI') to the received signal.

12. The receiving system of claim 11, wherein the received signal is an analog signal, the receiving system comprising:
- a conversion device suitable for converting an analog signal to a digital signal, the conversion device being connected to an input of the device for estimation and attenuation.

13. The receiving system of claim 11, wherein the receiving system comprises:
- a computing device connected to an output of the device for estimation and attenuation, the computing device being able to calculate a Fourier transform of the signal delivered by the device for estimation and attenuation, and
- a decoder connected to the computing device, the decoder being able to decode the signal delivered by the computing device.

* * * * *